J. MEREY.
ROTARY EMBOSSING MACHINE.
APPLICATION FILED SEPT. 2, 1920.

1,368,956.

Patented Feb. 15, 1921.
3 SHEETS—SHEET 1.

Witness:
G. L. Farrington

Inventor:
Julius Merey
by Albert Scheible
Attorney

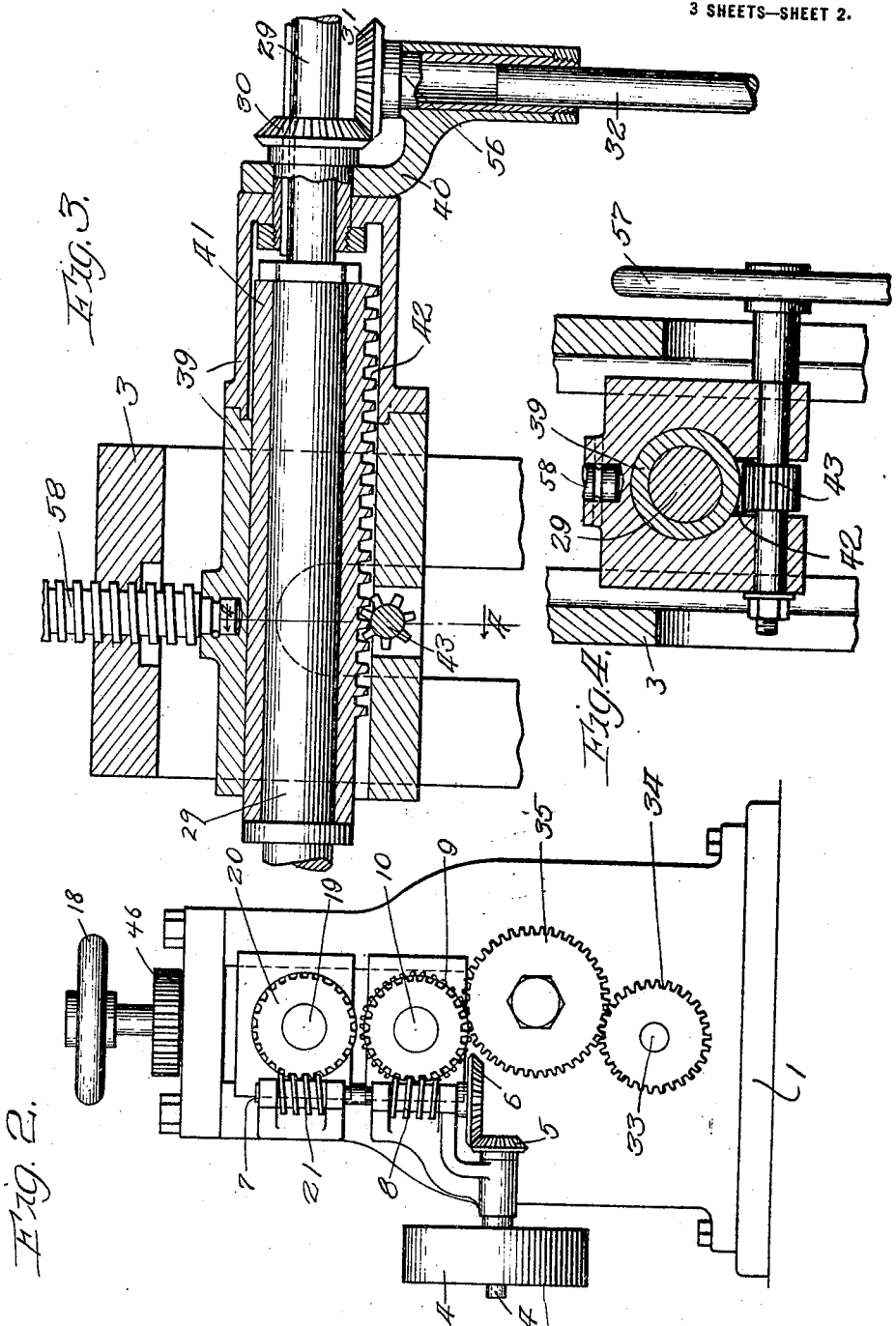

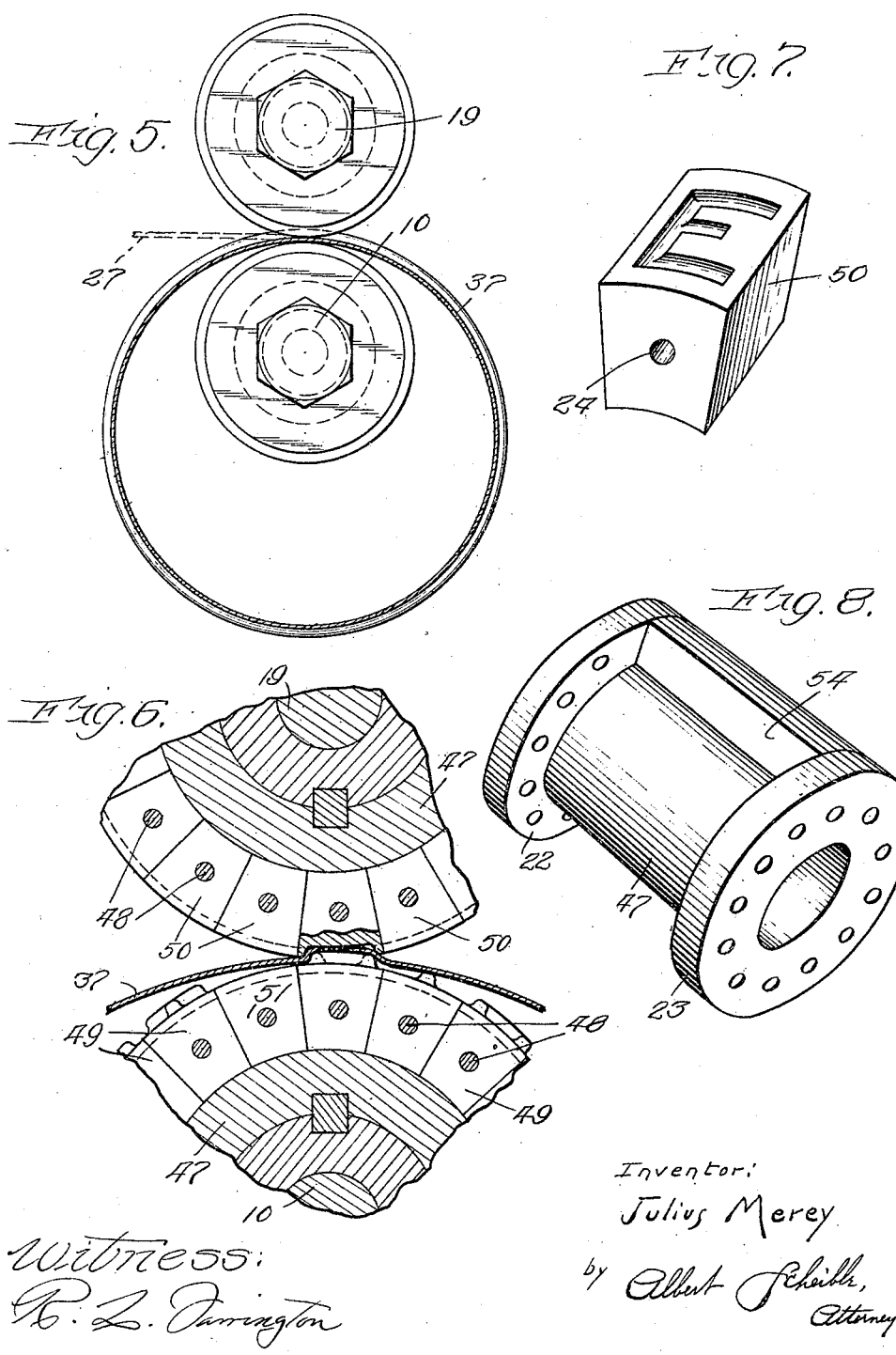

UNITED STATES PATENT OFFICE.

JULIUS MEREY, OF CHICAGO, ILLINOIS, ASSIGNOR OF ONE-HALF TO LOUIS WANDRIE, OF CHICAGO, ILLINOIS.

ROTARY EMBOSSING-MACHINE.

1,368,956.

Specification of Letters Patent.

Patented Feb. 15, 1921.

Application filed September 2, 1920. Serial No. 407,780.

*To all whom it may concern:*

Be it known that I, JULIUS MEREY, citizen of Hungary, residing at Chicago, Illinois, have invented certain new and useful Improvements in Rotary Embossing-Machines; and I do hereby declare the following to be a full, clear, and exact description of the invention, such as will enable others skilled in the art to which it appertains to make and use the same.

My invention relates to embossing machines, and in one of its general objects aims to provide a machine for embossing addresses or other legends on metal (or the like) with a rolling pressure and in such a manner as to effect only a relatively small portion of the embossing at one time, thereby steadying and reducing the power required and greatly reducing the strains on the machine. In another aspect, my invention aims to provide a machine for embossing curved surfaces, such as the sides of tubes, thereby preventing the damaging of such embossing by curving the metal after the embossing has been done upon the same. In this latter aspect, my invention also aims to provide simple and effective means auxiliary to the embossing dies for feeding various parts of the tube or other object successively into position for the embossing, and to arrange the tube-feeding means in such a manner that it can readily be adjusted to variations in the effective lengths of the tubes and in their diameters.

Furthermore, my invention aims to provide a machine for embossing metal or the like by rotary pressure, with the parts so arranged as to permit the embossing portions to be readily interchanged, so that any desired legend can be set up somewhat after the general manner of employing movable type, thereby saving both the cost and the delay involved for making separate die plates for each job. Still further and more detailed objects will appear from the following specification and from the accompanying drawings, in which drawings—

Fig. 2 is an elevation of the same machine, taken from the left hand side of Fig. 1.

Fig. 3 is an enlarged and fragmentary section through the right hand riser of Fig. 1, showing the connections to the shaft which carries the chuck.

Fig. 4 is an enlarged and fragmentary transverse section through the same riser, taken along the correspondingly numbered line in Fig. 3.

Fig. 5 is an enlarged end elevation of the embossing rollers, taken from the correspondingly numbered line in Fig. 1 and showing a tube as being embossed.

Fig. 6 is an enlarged and fragmentary section through the two embossing rollers and a portion of a tube which is being embossed by them.

Fig. 7 is a perspective view of one of the female embossing die portions as used on the upper embossing roller of the machine.

Fig. 8 is a perspective view of one of the drums carrying the embossing dies, showing the fixed spacer or thrust bar in position.

Figure 1:
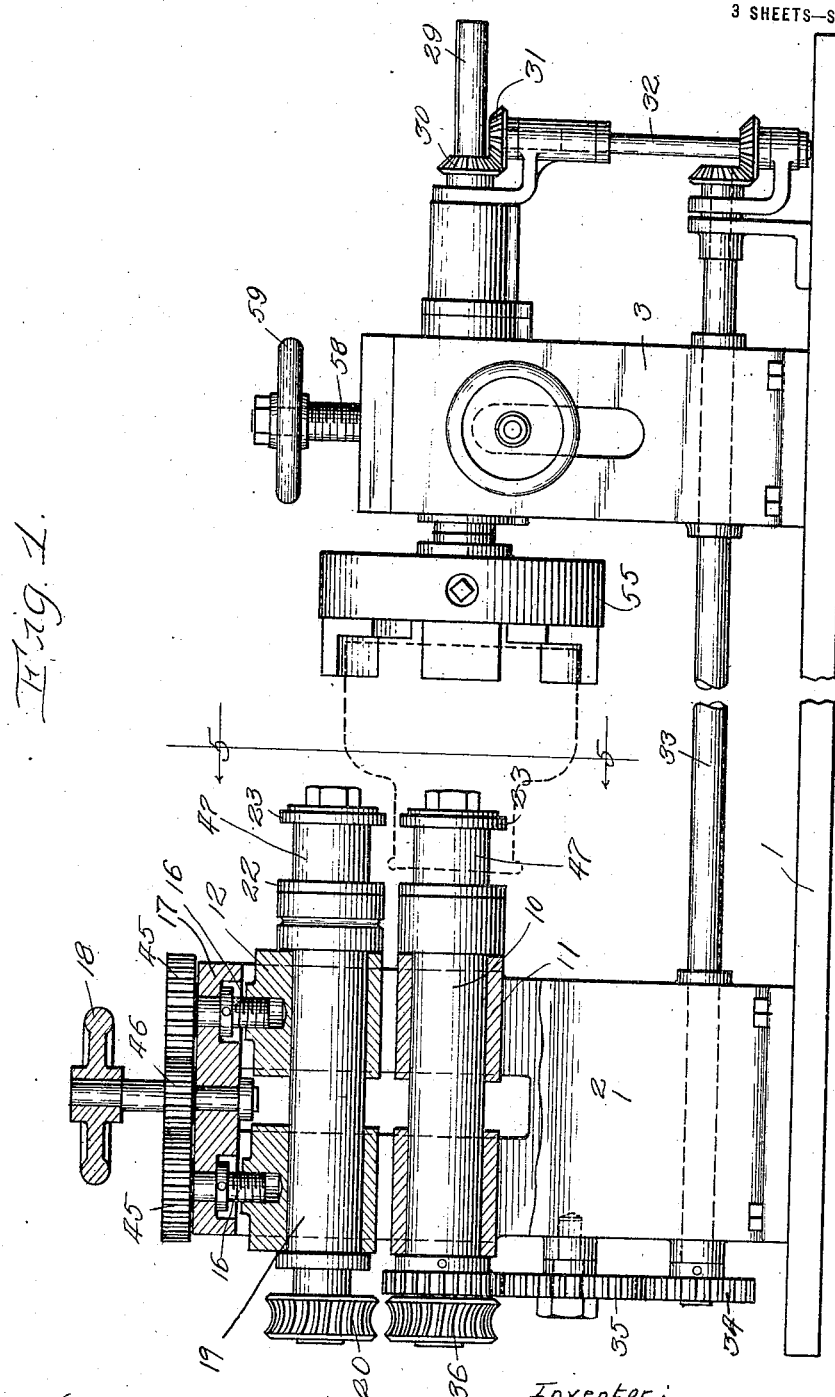
Figure 1 is a front elevation of a machine embodying my invention, with parts cut away to show the mounting of the shafts carrying the embossing elements.

In embossing sheet metal, it has heretofore been customary to do this while the metal was in a flat form, regardless of the shape in which the embossed piece was to be employed, and to count on the embossing as being sufficiently deep and rigid so that it would still be legible after the metal has been formed to the desired shape. In practice, this method has been far from satisfactory, both because it interfered with the ready curving of the embossed sheets, and because the pressure required for the curving was apt to flatten the embossed legend more or less, thereby interfering seriously with its legibility.

Moreover, such embossed legends usually consist of a large number of letters, figures and the like, for each of which a considerable pressure is required when the embossing is done on anything except such thin sheet material as would have very little strength. Consequently, the pressure required for embossing such a legend with a single movement has been such as to demand a press of greater power than is available in many shops where such embossing operations are needed, and the sudden strains on the motors or other driving mechanism due to the resulting heavy and intermittent load have also been objectionable. So also, the necessity of having separate pairs of embossing plates made for each job has not only limited the extent to which embossing has been employed, but also involves a considerable expense for these special plates as well as a delay in securing them.

My invention, which aims to overcome all of these objections, is particularly suitable for use in embossing hollow tubes or cylinders and I am therefore illustrating and describing it in such a connection, although I do not wish to be limited as to any particular use of the machine of my invention. In the embodiment of the drawings, my machine includes a supporting base 1 carrying a pair of standards 2 and 3 which are spaced from each other by a distance greater than the length of the tubes or the width of the sheets which are to be embossed. The main standard 2 has journaled upon it a transverse drive shaft 44 carrying a pulley 4 which is belted to any suitable source of power. This drive shaft 3 is connected through bevel gears 5 and 6 with a vertical worm shaft 7, which has a right hand worm 8 fastened to it, and this worm is intermeshed with a worm wheel 9 fastened to a horizontal shaft 10 extending longitudinally of the machine. The shaft 10 is journaled in bearings 11 which are stationary in the riser 2, and above these bearings the riser is forked to afford guides for a pair of bearing blocks 12 which can be raised or lowered by means of a pair of screws 16 threaded on the head 17 of the riser, these screws being connected by gears 45 and 46 to a hand wheel 18 so that the screws can be rotated simultaneously by turning this hand wheel. The vertically movable bearing blocks 12 afford journals for an upper shaft 19 carrying a worm wheel 20 and this worm wheel meshes with a left hand worm 21 which is also fastened to the vertical shaft 7, and which has a thread of such a length as to engage the worm wheel 20 regardless of the height to which the upper shaft 19 is raised or lowered by the above described connections to the hand wheel 18.

Fastened to the inner end of each of the two horizontal shafts is a drum 47 having end flanges 22 and 23 between which the embossing elements are bolted, the flanges on each drum having alined bores for receiving the bolts 48 which fasten the embossing die elements 49 or 50 in position. Each of these embossing die elements consists of a portion of a ring having an inner diameter equal to the outside diameter of the hub of one of the drums, and each of these die portions has a longitudinal bore 24 for receiving a fastening bolt 48. However, the die portions secured to the collar on one of the horizontal shafts (here shown as the lower one) have a letter, figure or the like projecting beyond the outer curved surface, and the corresponding die element fastened to the collar on the other horizontal shaft has the counterpart of the same letter, figure or the like depressed in it, so that each pair of these die elements is adapted to emboss its portion of the desired legend when squeezing the sheet of material between the same after the manner illustrated in Fig. 6.

To hold the die portions continuously in the proper operative positions, I desirably provide each collar with at least one stationary thrust bar 54 extending longitudinally of the same and affording a rigid shoulder against which the adjacent die elements abut. The bar 54 on each drum forms the starting point for setting up the legend from a supply of the movable type, excepting that the letters or the figures which are above one another or which aline vertically of the desired legend are all secured in position by a single screw passing through the bores 24 in the same, before the next vertical row of die elements is placed in position. Any desired spacing is likewise done by means of die elements 50 with plain outer surfaces, and the two collars are fastened rigidly to their respective shafts in such a position that the counterpart die portions of these will match when the shafts are rotated in opposite directions through the operation of the two worm wheels.

With the machine thus arranged, it will be obvious that the relative reverse direction of the two worms will cause the counterpart sets of embossing elements to rotate in opposite directions, so that they will successively bring consecutive vertical rows of the legend elements into operative position, it being understood that the elements on one of the drums are set up with the left hand edge of the thrust bar 54 as a starting point, while those of the other collar are set up as an opposite side of the thrust bar, so that the legend portions on the two drums read respectively in opposite directions. If the material is flat, it may easily be fed by hand into position for embossing the same, as shown in dotted lines by the sheet 27 in Fig. 5, and when the counterpart die portions have once engaged to a part of the sheet, they will automatically feed the sheet through the machine. Consequently, my machine can be used on flat stock with great rapidity, and since only a small portion of the total legend is embossed at one time, the strains on the machine are comparatively very light, so that a small machine is ample for the same embossing which according to the older methods required a punch press of great power. Furthermore, the gradual action eliminates the jerkiness or sudden strains on the source of power and also increases the durability of the machine.

Where the embossing is to be done on tubes or the like, such as ice cream cans or milk cans, my machine may similarly be used by merely holding the proper portion of the tube between the embossing rollers while the upper roller is raised for some distance out of action, and then lowering this roller by means of the hand wheel 18 to the proper embossing depth. However, with objects of this kind, I desirably provide suitable means for guiding the tube or can so that its axis will be exactly parallel to the shafts of the embossing rollers. With heavy stock, I also desirably provide mechanical means for automatically rotating the can or other tubular object so as to feed the parts successively into position for the embossing, instead of depending on the embossing die portions to rotate the stock. For this purpose, I am here showing a chuck 55 which can readily be adjusted to the diameter of the can or other object by any of the methods usually employed for moving jaw chucks, and which is fast upon a chuck shaft 29.

The chuck shaft 29 is splined to a bevel gear 30 meshing with a companion gear 31 on a vertical shaft 32 which in turn is geared to a shaft 33 extending longitudinally of the machine and connected through gears 34 and 35 with a gear 36 fastened to the shaft 10 which carries the lower worm wheel. Consequently, the driving mechanism for the embossing rollers also rotates the chuck shaft 29 through the connections just described and therefore positively rotates the tubular object which is to be embossed, and which is here indicated in dotted lines as a can 37. By removing the gears 34 and 35 and substituting gears of other ratio, I can vary the relative speed of the chuck shaft as compared with that of the embossing rollers and can therefore adapt my machine for use with cans, tubes or the like of different diameters. To bring the upper edge of the tube into proper alinement with the opposed surfaces, I journal the shaft 29 in a bearing 39 which is slidable in the riser 3 and which can be raised or lowered by means of a hand screw 58. The journal 39 as provided for this purpose (here shown as built up of two parts to facilitate its manufacture) also carries a bracket 40 affording a journal for the hub of the bevel gear 31, and this hub 56 is splined to the vertical shaft 32 so as to maintain the driving connection between the shaft 32, and the said bevel gear while permitting the chuck and chuck shaft and the gears 30 and 31 to be raised or lowered when the adjustment is made for different sizes of the tubes or cans.

To provide for different lengths of such tubes or cans, I do not journal the sleeve 41, to which the chuck shaft 29 is splined, directly in the riser 3. Instead, I mount this sleeve slidably in the bearing block 39 and equip it with a rack 42 which can be moved backward or forward by a pinion 43 meshing with the rack and rotated through a hand wheel 57. In this manner, I can vary the distance of the chuck from the ends of the embossing rollers while still maintaining the operative connection between the chuck and the bevel gear 30 which rotates the same. Moreover, I desirably fork the riser 3 so that it will permit the bearing block 39 to move vertically, and connect this block to the cap of the riser 3 through a screw 58 which can be rotated by a hand wheel 59. By turning this hand wheel, I can raise or lower the chuck shaft (which has its axis in the same plane with the shafts 10 and 19) so as to adapt my machine to cans or tubes of various diameters, and in making such vertical adjustments the splined connection between the hub 56 and the vertical shaft 32 continuously maintains the operative driving connection.

However, while I have illustrated and described my machine in an embodiment including desirable arrangements for driving and adjusting the various parts and for maintaining the operative connections between them while making various adjustments, I do not wish to be limited to the details of construction and arrangement as thus disclosed, it being obvious that the same might be modified in many ways without departing from the spirit of my invention.

I claim as my invention:—

1. In a machine for embossing tubular metal, a pair of parallel shafts, means for simultaneously rotating the shafts in opposite directions, counterpart embossing elements carried respectively by the two shafts, and a chuck rotatably mounted for holding the tubular metal and having its axis in the same plane with the said shafts.

2. In a machine for embossing tubular metal, a pair of parallel shafts, means for simultaneously rotating the shafts in opposite directions, counterpart embossing elements carried respectively by the two shafts, a chuck rotatably mounted for holding the tubular metal and having its axis in the same plane with the said shafts, and means for rotating the chuck concurrently with the shafts so as to pass a portion of the tubular metal between the counterpart embossing elements.

3. In a machine for embossing tubular stock adjacent to one end of the latter, counterpart embossing means respectively engaging the inner and outer faces of the stock adjacent to the said end, and separate means for holding the other end of the stock.

4. In a machine for embossing tubular stock adjacent to one end of the latter, counterpart embossing means respectively engaging the inner and outer faces of the stock adjacent to the said end, and separate means for holding the other end of the stock, and means for adjusting the position of the holding means both longitudinally and transversely of the embossing means.

5. In an embossing machine, a supporting member, a pair of parallel shafts rotatably carried thereby, worm wheels respectively fast on the rear ends of the shafts, counterpart embossing dies mounted respectively on the forward ends of the shafts, a right-hand and a left-hand worm respectively meshing with the two worm wheels and each of such length as to intermesh with one of the worm wheels regardless of the distance between the said parallel shafts, and a single drive shaft having the said worms fast thereon.

6. In a machine for embossing tubular metal, a pair of parallel shafts, means for simultaneously rotating the shafts in opposite directions, counterpart embossing elements carried respectively by the two shafts, a chuck rotatably mounted for holding the tubular metal and having its axis in the same plane with the said shafts, and means for moving the chuck longitudinally of its axis to vary the distance between the chuck and the embossing elements.

7. In a machine for embossing tubular metal, a pair of parallel shafts, means for simultaneously rotating the shafts in opposite directions, counterpart embossing elements carried respectively by the two shafts, a chuck rotatably mounted for holding the tubular metal and having its axis in the same plane with the said shafts, and means for moving the chuck in the said plane and transversely of its own axis.

8. In a machine for embossing tubular metal, a pair of vertically spaced parallel shafts, means for simultaneously rotating the shafts in opposite directions, counterpart embossing elements carried respectively by the two shafts, a chuck rotatably mounted for holding the tubular metal and having its axis in the same plane with the said shafts, and separate means for raising and lowering the axis of the chuck and for moving the chuck longitudinally of its axis.

9. In a machine for embossing tubular metal, a pair of vertically spaced parallel shafts, means for simultaneously rotating the shafts in opposite directions, counterpart embossing elements carried respectively by the two shafts, a chuck rotatably mounted for holding the tubular metal and having its axis in the same plane with the said shafts, means for rotating the chuck, and means for raising or lowering the chuck without disturbing the chuck-rotating means.

10. In a machine for embossing tubular metal, a pair of parallel shafts, means for simultaneously rotating the shafts in opposite directions, counterpart embossing elements carried respectively by the two shafts, a chuck rotatably mounted for holding the tubular metal and having its axis in the same plane with the said shafts, means for rotating the chuck, and means for moving the chuck along its axis without disturbing the chuck-rotating means.

11. In a machine for embossing tubular metal, a pair of parallel shafts, means for simultaneously rotating the shafts in opposite directions, counterpart embossing elements carried respectively by the two shafts, a chuck rotatably mounted for holding the tubular metal and having its axis in the same plane with the said shafts, means for rotating the chuck concurrently with the shafts so as to pass a portion of the tubular metal between the counterpart embossing elements, and means for adjusting the position of the chuck both transversely of the said shafts and longitudinally of the axis of the chuck without disturbing the chuck-rotating means.

12. In an embossing machine, a supporting member including a pair of risers, a pair of shafts rotatably carried by one of the risers and a third shaft rotatably carried by the other riser, the axis of the three shafts all being parallel and in the same plane, one of the first named shafts having its axis in a fixed position; coöperating embossing rollers carried by the last named shaft and one of the other shafts, stockholding means upon one of the other shafts, and means for moving the axes of the other two shafts with respect to that of the last named shaft.

Signed at Chicago, Illinois, August 28th, 1920.

JULIUS MEREY.